No. 824,246. PATENTED JUNE 26, 1906.
G. A. JONES.
ANIMAL TRAP.
APPLICATION FILED FEB. 27, 1906.
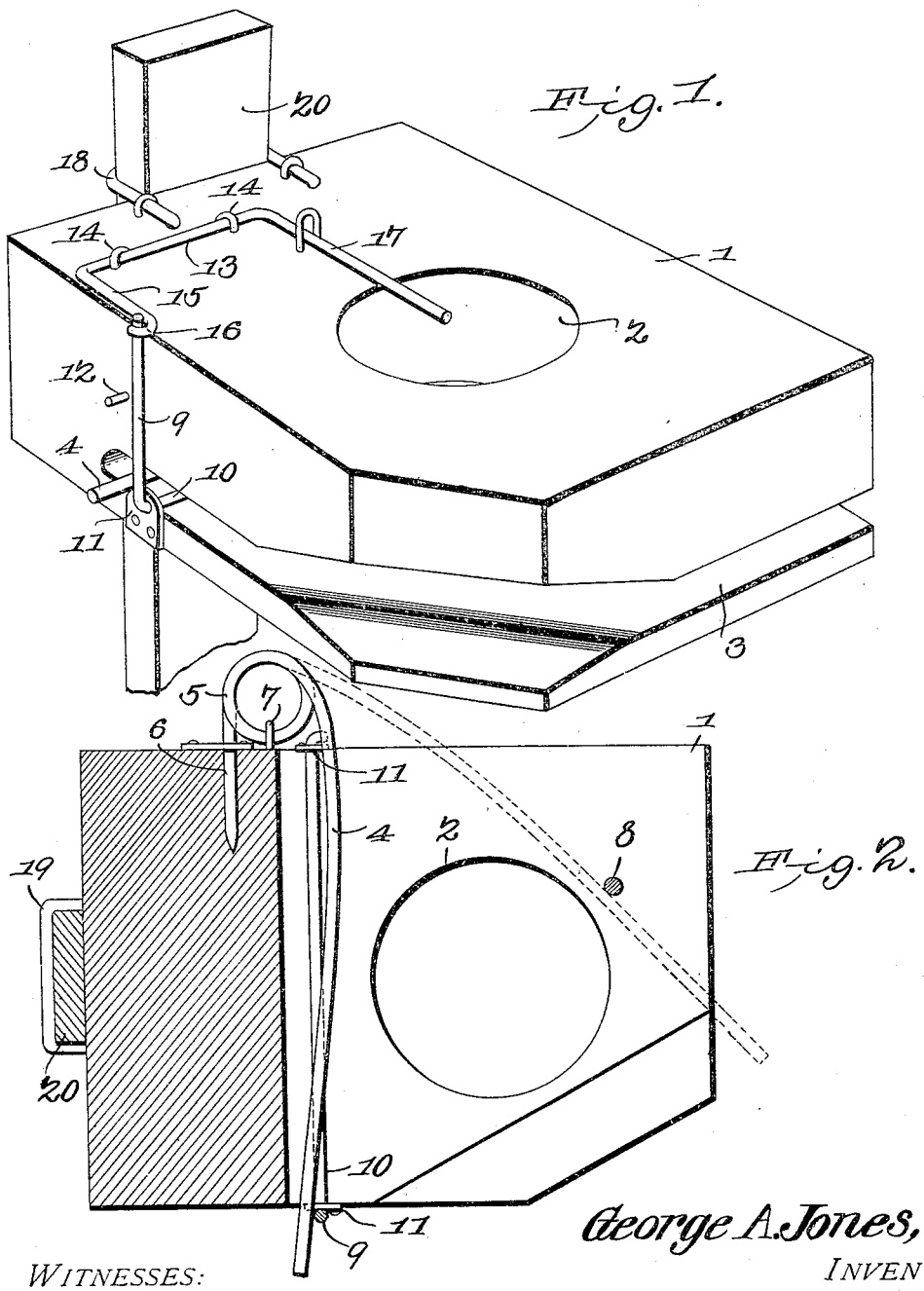
WITNESSES:
George A. Jones,
INVENTOR.
By C. A. Snow & Co
ATTORNEYS

UNITED STATES PATENT OFFICE.

GEORGE AUGUSTUS JONES, OF UNIVERSITY PLACE, NEBRASKA.

ANIMAL-TRAP.

No. 824,246.  Specification of Letters Patent.  Patented June 26, 1906.

Application filed February 27, 1906. Serial No. 303,233.

*To all whom it may concern:*

Be it known that I, GEORGE AUGUSTUS JONES, a citizen of the United States, residing at University Place, in the county of Lancaster and State of Nebraska, have invented a new and useful Animal-Trap, of which the following is a specification.

This invention relates to traps, and has for its object to provide an improved choking-trap particularly adapted for catching small animals—such, for instance, as gophers.

It is furthermore designed to provide for conveniently setting the trap and to arrange the parts thereof so as to avoid springing of the trap without catching the animal.

Another object of the invention is to provide for anchoring the trap over the gopher's hole in such a manner as to compel the animal to enter the trap when endeavoring to pass out of the hole. In this connection it is proposed to firmly secure the trap to the ground, so as to prevent carrying off of the same by the animal.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a trap embodying the features of the present invention. Fig. 2 is a central horizontal sectional view thereof.

Like characters of reference designate corresponding parts in both the figures of the drawings.

The present trap includes a body 1, preferably a block of wood of suitable proportions, which is pierced from top to bottom by an opening 2, and one end of the block is provided with a longitudinal bifurcation 3, disposed at right angles to the direction of the opening 2 and intersecting the same. A spring-jaw 4 works in the bifurcation and projects through opposite edges thereof, one end of the arm being bent into a spring-coil 5, with its adjacent extremity formed into a prong 6, driven into the body so as to secure the jaw thereto. A staple or the like 7 embraces one or more of the coils of the spring and is driven into the body of the trap as an additional fastening for the spring-jaw. When the trap is set, the jaw is disposed transversely of the trap in rear of the opening 2, and its forward movement is limited by a suitable stop 8, such as a pin piercing the body and extending across the bifurcation at one side of the opening 3.

For holding the spring-jaw under tension there is a swinging catch 9 designed to stand up across the front side of the jaw and carried by a rock-bar 10, extending across the back of the bifurcation in rear of the jaw and mounted in bearing-plates 11, secured to opposite sides of the body and lapping the respective open edges of the bifurcation. A suitable stop projection 12 is carried by the body in rear of the catch 9 to limit its rearward movements.

A rock-bar 13 is mounted upon the top of the trap in suitable bearings 14, such as staples driven into the body, the outer end of the rock-bar having a crank-arm 15 terminating in a hook 16, embracing the front side of the free end of the catch 9, and thereby lock the latter and hold the jaw under tension. The inner end of the rock-bar 13 is provided with a crank-arm 17, which is of a length to project across the top of the opening 2 and constitute a trip for releasing the arm 15 from the catch 9.

For the purpose of anchoring the trap to the ground loops 18 and 19 are projected from the rear of the body, at the bottom and top thereof, said loops being in alinement, the upper loop being slightly wider than the lower loop, so as to receive a downwardly-tapered anchoring-stake 20, which is driven into the ground so as to hold the trap with its opening 2 over the hole in the ground. When the animal seeks to pass up through the opening 2, the trigger 17 is pushed upwardly, thereby rocking the bar 13 and swinging the trigger, and thus disengaging the latch 15 from the keeper 19, whereupon the spring-jaw is released and snaps forwardly across the opening 2 and grips the neck of the animal between the jaw and the opposite side of the opening. By reason of the trap being firmly anchored in the ground by the stake 20 the trap cannot be carried off by the animal.

Having thus described the invention, what is claimed is—

1. An animal-trap comprising a body, having an opening therethrough, and provided with a slot intersecting the opening transversely thereof, a spring-jaw working in the slot across the opening, means for holding the jaw under tension, and a trigger associated with said means to release the same and located across the opening.

2. An animal-trap comprising a body having a passage therethrough and provided with a slot intersecting the passage, a spring-jaw working in the slot and across the passage with the other end of the jaw projecting through the slot, a movable keeper carried upon the exterior of the body for engagement with the free end of the jaw to hold it under tension, a swinging latch for engagement with the keeper, and a trigger associated with the latch and disposed across the passage.

3. An animal-trap comprising a body having a passage therethrough and provided with a slot intersecting the passage at substantially right angles thereto, a spring-jaw working in the slot across the passage, a rock-bar mounted in the slot and provided with a crank-arm working upon the exterior of the body and constituting a keeper to engage the free end of the jaw, and another rock-bar mounted upon the exterior of the body and provided with a crank-arm having a hook to engage the keeper and also provided with a trigger-arm disposed across the passage.

4. An animal-trap having a passage piercing the top and bottom thereof, a spring-jaw working across the passage, a movable keeper to hold the jaw under tension, a trigger associated with the keeper, upper and lower loops carried by and projecting beyond the body, and a downwardly-tapered anchoring-stake to be driven through the loops and into the ground.

In testimony that I claim the foregoing as my own I have hereto affixed my signature in the presence of two witnesses.

GEORGE AUGUSTUS JONES.

Witnesses:
M. L. EASTERDAY,
W. S. LICHTY.